(12) United States Patent
Kobayashi et al.

(10) Patent No.: US 11,014,434 B2
(45) Date of Patent: May 25, 2021

(54) SUNSHADE DEVICE

(71) Applicant: AISIN SEIKI KABUSHIKI KAISHA, Kariya (JP)

(72) Inventors: Hinako Kobayashi, Toyota (JP); Naoto Kamioku, Kariya (JP); Kazuhiko Yoshizawa, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 192 days.

(21) Appl. No.: 15/945,368

(22) Filed: Apr. 4, 2018

(65) Prior Publication Data
US 2018/0290525 A1    Oct. 11, 2018

(30) Foreign Application Priority Data

Apr. 6, 2017   (JP) .............................. JP2017-075870

(51) Int. Cl.
*B60J 7/00* (2006.01)
*B60J 1/20* (2006.01)

(52) U.S. Cl.
CPC ........... *B60J 7/0015* (2013.01); *B60J 1/2044* (2013.01)

(58) Field of Classification Search
CPC ........ B60J 7/0015; B60J 7/043; B60J 1/2044; B60J 1/2052
See application file for complete search history.

(56) References Cited

U.S. PATENT DOCUMENTS

| | | | |
|---|---|---|---|
| 7,029,061 B2 * | 4/2006 | Lin | B60J 7/0015 296/214 |
| 7,798,568 B2 * | 9/2010 | Keller | B60J 7/0015 160/273.1 |
| 7,967,052 B2 | 6/2011 | Lin | |
| 8,997,831 B2 * | 4/2015 | Lin | B60J 7/0015 160/370.22 |
| 9,039,076 B2 * | 5/2015 | Rooijakkers | B60J 1/2069 296/223 |
| 9,827,836 B2 * | 11/2017 | Nellen | B60J 7/0015 |

(Continued)

FOREIGN PATENT DOCUMENTS

JP     2008-024266 A     2/2008

OTHER PUBLICATIONS

English language translation of Notice of Reason for Refusal issued in Japanese Application No. 2017-075870 dated Dec. 22, 2020.

*Primary Examiner* — Katherine W Mitchell
*Assistant Examiner* — Abe Massad
(74) *Attorney, Agent, or Firm* — Finnegan, Henderson, Farabow, Garrett & Dunner, LLP

(57) ABSTRACT

A sunshade device includes: a roll shade having a shade; a rod provided in a front end portion of the shade; two guide rails each configured to guide the shade; two first sliding members each having a slider attached to a corresponding one of opposite ends of the rod and guided by a corresponding one of the guide rails; and two second sliding members each having a shade support portion configured to support a shade corner portion and guided by a corresponding one of the guide rails, wherein the slider and the shade support portion are arranged in a direction crossing an advancing and retreating direction of the shade, and at least a portion of the slider and at least a portion of the shade support portion are disposed on a lateral side of the rod in a lateral direction along the rod.

8 Claims, 5 Drawing Sheets

(56) References Cited

U.S. PATENT DOCUMENTS

| | | | |
|---|---|---|---|
| 2016/0185194 A1* | 6/2016 | Rikkert | B60J 7/003 160/368.1 |
| 2016/0221424 A1* | 8/2016 | Van Boxtel | B60J 7/067 |
| 2017/0008383 A1 | 1/2017 | Ten-Jet-Foei | |

* cited by examiner

SUNSHADE DEVICE

CROSS REFERENCE TO RELATED APPLICATIONS

This application is based on and claims priority under 35 U.S.C. § 119 to Japanese Patent Application 2017-075870, filed on Apr. 6, 2017, the entire contents of which are incorporated herein by reference.

TECHNICAL FIELD

This disclosure relates to a sunshade device that blocks light.

BACKGROUND DISCUSSION

As a sunshade device mounted on a vehicle, a technique described in U.S. Pat. No. 7,967,052 (Reference 1) is known.

The sunshade device described in Reference 1 includes a shade and a pair of guide rails which guides the shade. A rod is provided in a front end portion of the shade, and slides are provided on opposite ends of the rod. The slides are guided by the guide rails. Each of the slides includes a connecting portion connected to a corresponding end of the rod, a plate portion extending from the connecting portion to the winding side (the center shaft side of the shade), and a slide extending from the plate portion to a guide rail side. A guide device is attached to the plate portion to support the end portion of the shade.

Incidentally, in the sunshade device, a large opening area in a state where the shade is wound up is desirable.

Thus, a need exists for a sunshade device which is not susceptible to the drawback mentioned above.

SUMMARY

A sunshade device according to an aspect of this disclosure includes: a roll shade having a shade; a rod provided in a front end portion of the shade; two guide rails each configured to guide the shade; two first sliding members each having a slider attached to a corresponding one of opposite ends of the rod and guided by a corresponding one of the guide rails; and two second sliding members each having a shade support portion configured to support a shade corner portion and guided by a corresponding one of the guide rails. The slider of each first sliding member and the shade support portion of each second sliding member are arranged in a direction crossing an advancing and retreating direction of the shade, and at least a portion of the slider of the first sliding member and at least a portion of the shade support portion of the second sliding member are disposed on a lateral side of the rod in a lateral direction along the rod.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A sunshade device will be described with reference to FIGS. 1 to 10.

In the following description, a "vehicle vertical direction" in a vehicle indicates the direction along the vertical direction when the vehicle is placed on a flat ground. A "vehicle vertical direction DZ" in a sunshade device is the direction along the vehicle vertical direction of the vehicle in a reference posture, which is the posture of the sunshade device when the sunshade device is mounted on the vehicle.

In the sunshade device, a "vehicle longitudinal direction DY" is the direction along the vehicle longitudinal direction of the vehicle when the sunshade device is in the reference posture.

In the sunshade device, a "vehicle width direction DX" is the direction along the vehicle width direction of the vehicle when the sunshade device is in the reference posture.

A sunshade device 1 is attached under a vehicle roof opening. The sunshade device is mainly attached under a sunroof device of the vehicle. The sunshade device 1 moves a shade 11 in order to enlarge and reduce the light shielding area.

Figure 1:
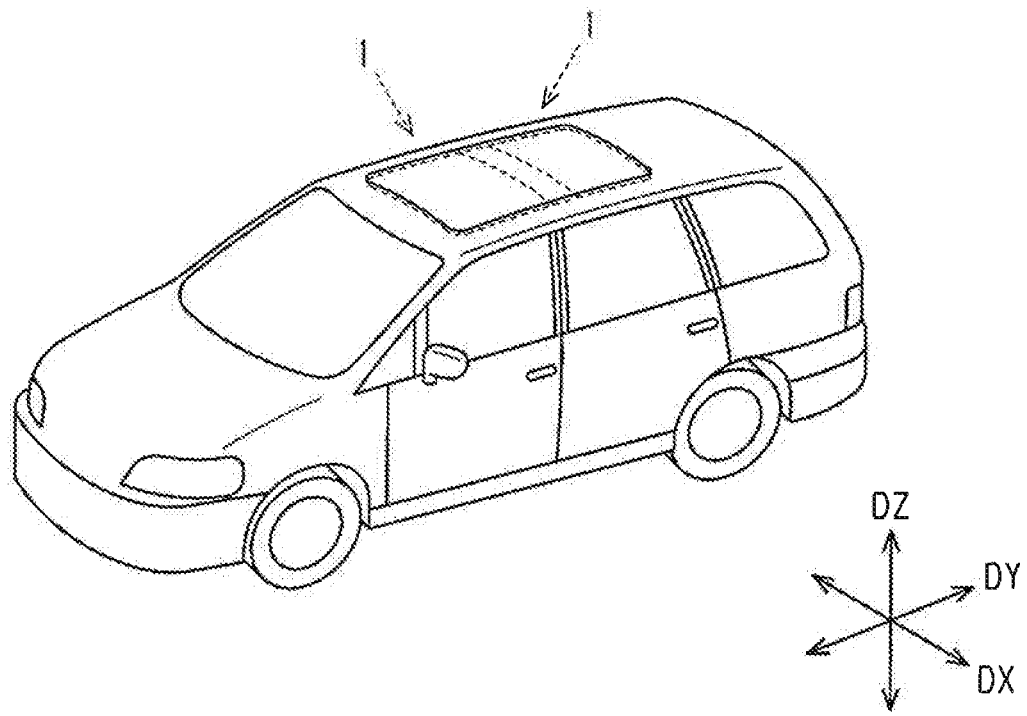
FIG. 1 is a perspective view of a vehicle having a sunshade device.
Figure 2:
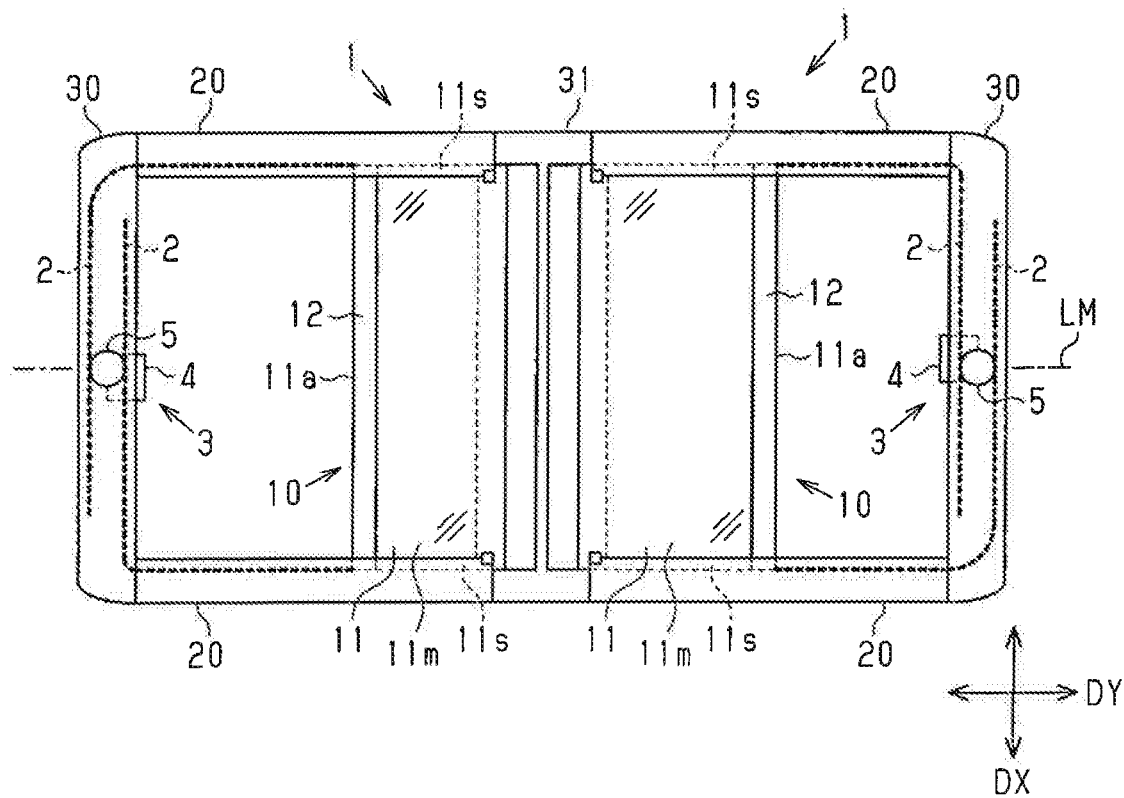
FIG. 2 is a schematic view of the sunshade device.

A unit illustrated in FIG. 2 includes two sunshade devices 1. The two sunshade devices 1 are arranged in the vehicle longitudinal direction DY. The front sunshade device 1 deploys the shade 11 forward. The rear sunshade device 1 deploys the shade 11 rearward.

In the following description, the direction in which a rod 12 (see the following description) of the shade 11 moves will be referred to as "advancing and retreating direction DA". The direction of movement of the rod 12 when the shade 11 is deployed so as to be widened will be referred to as "front", and the opposite direction of "forward" is referred to as "rear". In addition, the direction along the longitudinal direction of the rod 12 will be referred to as a "lateral direction DB". The direction crossing the advancing and retreating direction DA and the lateral direction DB will be referred to as a "vertical direction DC". In the present embodiment, "upper" means the vehicle roof side in the vertical direction DC, and "lower" means the vehicle floor side in the vertical direction DC. In the sunshade device 1, a line that passes through the intermediate point in the lateral direction DB and extends in the advancing and retreating direction DA will be referred to as an "intermediate line LM". In the present embodiment, the lateral direction DB, the vertical direction DC, and the advancing and retreating direction DA are orthogonal to each other. In addition, in the lateral direction DB, the direction toward the intermediate line LM will be referred to as "inward", and the opposite direction of the "inward" will be referred to as "outward". In the present embodiment, in the reference posture of the sunshade device 1, the "advancing and retreating direction DA" and the "vehicle longitudinal direction DY" coincide with each other, the "lateral direction DB" and the "vehicle width direction DX" coincide with each other, and the "vertical direction DC" and the "vehicle vertical direction DZ" coincide with each other. In, addition, the front of the vehicle may not coincide with the front in the advancing and retreating direction DA. Specifically, in the sunshade device 1 disposed on the rear portion in FIG. 1, the "front" coincides with the rear of the vehicle. In the present embodiment, the "front" and the "rear" mean the "front" and the "rear" in the advancing and retreating direction DA of the sunshade device 1.

The sunshade device 1 includes a roll shade 10, two first sliding members 40, two second sliding members 50, and two guide rails 20, which guide the first sliding members 40 and the second sliding members 50. In the present embodiment, the sunshade device 1 further includes a drive device 3, which pulls out the shade 11.

The roll shade 10 includes the shade 11 and a center shaft 13 around which the shade 11 is wound. The shade 11 is biased in the direction in which the shade 11 is wound around the center shaft 13 by a retractor (not illustrated) provided in the center shaft 13. Hereinafter, the biasing force by the retractor is referred to as "winding biasing force".

Figure 3:
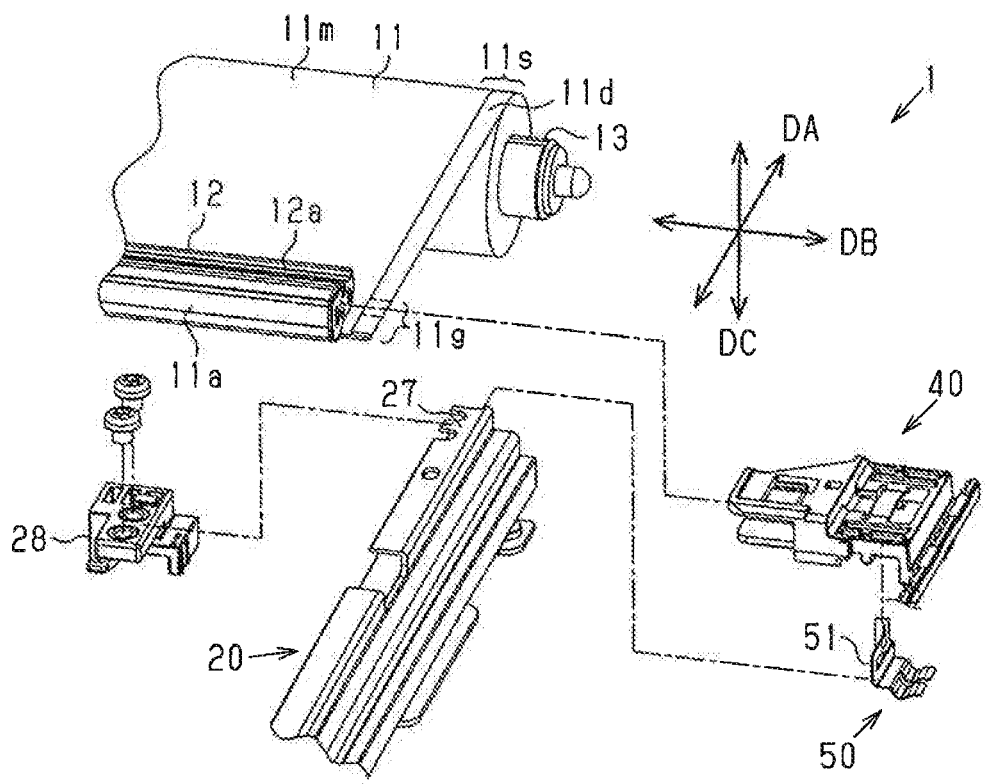
FIG. 3 is an exploded perspective view of the sunshade device.
Figure 4:
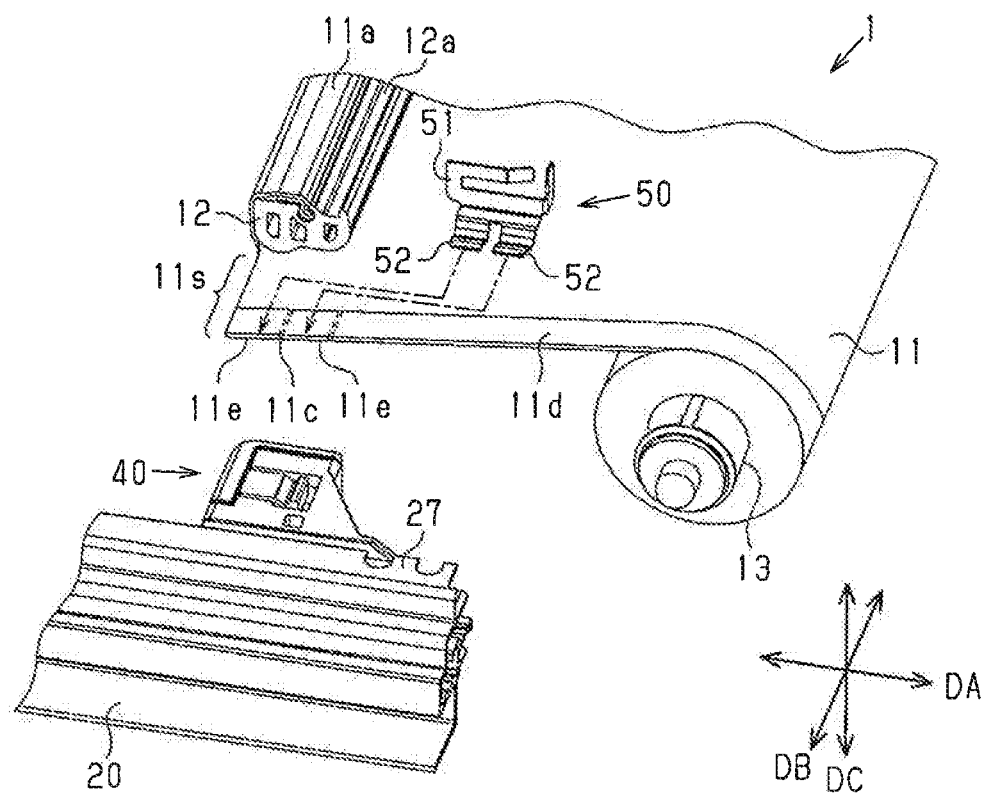
FIG. 4 is an exploded perspective view of the sunshade device viewed from another direction.

As illustrated in FIGS. 3 and 4, the rod 12 is attached to a front end portion 11a of the shade 11. Specifically, the front end portion 11a of the shade 11 is wound around the rod 12. The lateral width (the width length in the lateral direction DB) of the shade 11 is longer than the lateral width of the rod 12. That is, the shade 11 includes an intermediate portion 11m, which has the same width as that of the rod 12, and side portions 11s, which are portions outside the intermediate portion 11m in the lateral direction DB. Each lateral end portion of the shade 11 is folded back. The folded portion (hereinafter, a "folded portion 11d") is included in each side portion 11s. A portion of the side portion 11s of the shade 11 is accommodated in a second guide groove 25 of the guide rail 20 (see FIG. 10). A portion of the side portion 11s of the shade 11 (hereinafter, "shade corner portion 11g") that is disposed on the lateral side of the rod 12 is supported by the second sliding member 50 to be described later, so as to be guided, along with the second sliding member 50, in the second guide groove 25. Two bags lie are provided in the shade corner portion 11g. Shade support portions 52 (see the following description) of the second sliding member 50 are inserted into the respective bags 11e. The two bags 11e are provided in the folded portion 11d of the shade 11. Specifically, the bags 11e are open inward in the lateral direction DB. In addition, the bags 11e are partitioned from adjacent portions in the advancing and retreating direction by stitches 11c.

Figure 5:
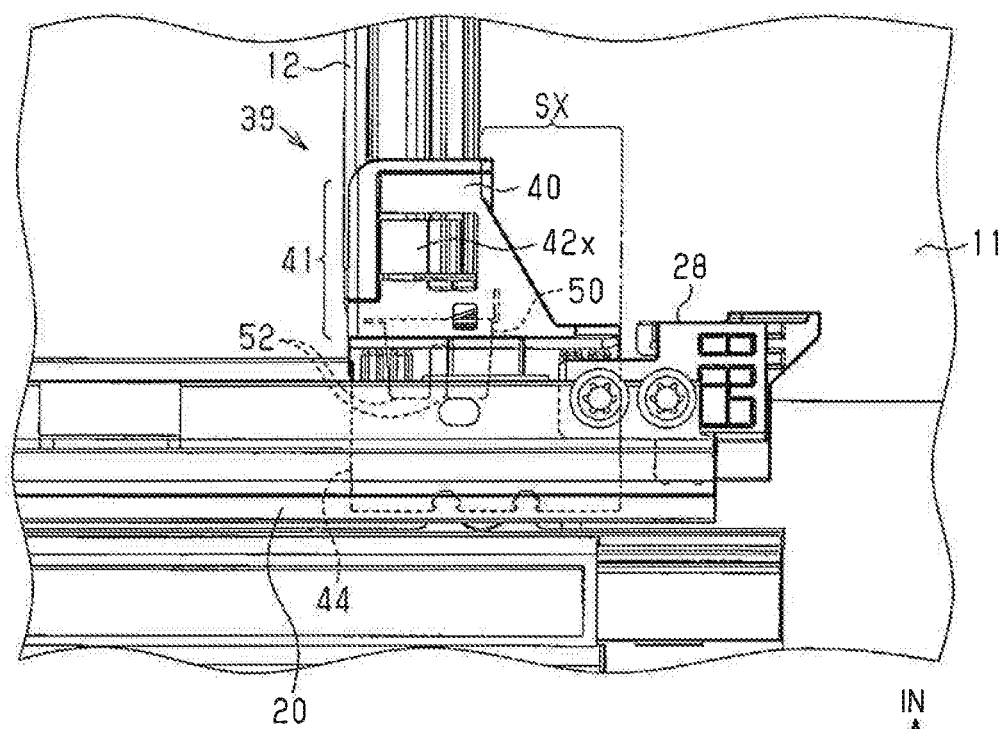
FIG. 5 is a plan view of a portion of the sunshade device that is guided by a guide rail.

As illustrated in FIG. 5, the first sliding members 40 are attached to opposite ends of the rod 12 in the lateral direction DB. In addition, the second sliding members 50 are attached to the opposite ends of the rod 12 in the lateral direction DB. The first sliding members 40 and the second sliding members 50 will be described later.

The two guide rails 20 are attached to the roof of the vehicle. The two guide rails 20 are disposed such that the shade 11 in the lateral direction DB is sandwiched therebetween. The two guide rails 20 extend in the vehicle longitudinal direction DY (the advancing and retreating direction DA of the shade 11). In addition, the two guide rails 20 are disposed in front of the center shaft 13 of the shade 11 (on the front side in the advancing and retreating direction DA). A stopper 28 is provided on the rear side end portion of the guide rail 20 (on the rear side in the advancing and retreating direction DA) to stop the rod 12 of the shade 11. The stopper 28 prevents the rod 12 from moving to the center shaft 13 side beyond a predetermined position (hereinafter, "limit position").

The two guide rails 20 are connected to a housing 30 on one side thereof in the advancing and retreating direction DA, and are connected to a frame 31 on the other side thereof. The roll shade 10 is disposed on the frame 31.

Figure 10:
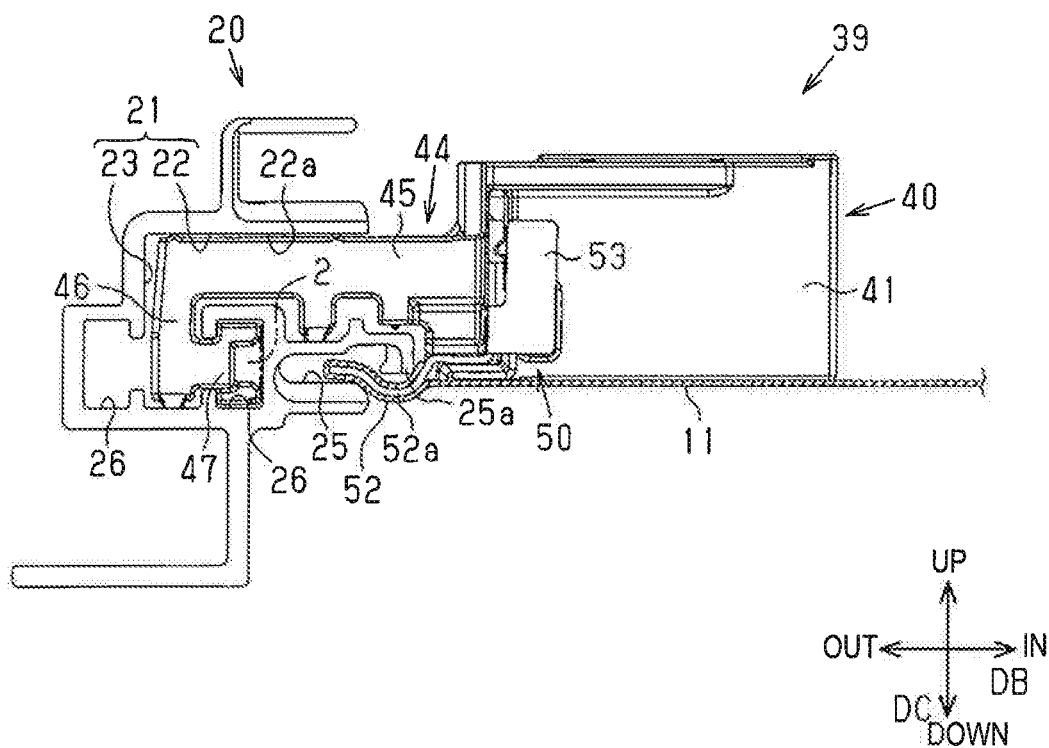
FIG. 10 is a rear view of a guide assembly, which is an assembly of the first sliding member and a second sliding member.

As illustrated in FIG. 10, each of the guide rails 20 includes a first guide groove 21 configured to guide a slider 44 (see the following description), the second guide groove 25 configured to guide the shade support portion 52, and two third guide grooves 26 configured to guide a power transmission member 2. The first guide groove 21, the second guide groove 25, and the third guide grooves 26 extend in the vehicle longitudinal direction DY (the advancing and retreating direction DA of the shade 11).

The first guide groove 21 includes a first arm guide 22 and a second arm guide 23. In the rear view (see FIG. 10) of the guide rail 20, the first arm guide 22 extends in the lateral direction DB and is open inward. The second arm guide 23 communicates with the first arm guide 22, and extends downward from an outer end of the first arm guide 22. The third guide grooves 26 are disposed on opposite sides of the lateral direction DB under the second arm guide 23, and communicate with the second arm guide 23.

The second guide groove 25 is disposed under the first arm guide 22, and is also disposed inside the second arm guide 23 in the lateral direction DB.

In the rear view, the second guide groove 25 extends in the lateral direction DB, and is open inward. A convex portion 25a is formed on an opening portion of the second guide groove 25 to extend downward. The convex portion 25a may come into contact with a concave portion 52a of the shade support portion 52.

In addition, a stopper fixing portion 27 is provided on the rear side end portion on of the guide rail 20 in the advancing and retreating direction DA. The aforementioned stopper 28 is fixed to the stopper fixing portion 27.

The drive device 3 includes a motor 4, a gear 5, which is rotated by rotational power of the motor 4, and two power transmission members 2, which are engaged with the gear 5 and are also connected to the first sliding members 40. The gear 5 is disposed on a member on the side opposite to the portion on which the shaft center 13 is disposed with the deploying region of the shade 11 therebetween. Specifically, when the center shaft 13 is supported by the frame 31, the gear 5 is attached to the housing 30. The power transmission members 2 are belts or cables. One of the power transmission members 2 is connected to one of the first sliding members 40. The other power transmission member 2 is connected to the other first sliding member 40. The two power transmission members 2 move in opposite directions in the portion of the gear 5 by the rotation of the gear 5. Thus, the two power transmission members 2 move in the same direction in the portion of the guide rails 20. When the power transmission members 2 move forward, the first sliding members 40 move forward along the guide rails 20, thus causing the shade 11 to be deployed. When the power transmission members 2 move rearward, the first sliding members 40 move rearward along the guide rails 20, thus causing the shade 11 to be wound around the center shaft 13. When the rod 12 of the shade 11 reaches the limit position by the rearward movement of the power transmission members 2, a guide assembly 39 (see the following description) disposed on the lateral side of the rod 12 abuts on the stopper 28. At this time, the opening area of the sunshade device 1 is maximized. The opening area means a difference between the light shielding area by the shade 11 when the shade 11 is most pulled out and the light shielding area by the shade 11 when the shade 11 is wound only by a predetermined amount and the rod 12 is stopped at an arbitrary position.

The first sliding member 40 will be described with reference to FIGS. 6 to 8.

The first sliding member 40 includes a connector 41 connected to an end of the rod 12 and a slider 44. The slider 44 slides along the first guide groove 21 of the guide rail 20 by power of the power transmission member 2, and is guided by the first guide groove 21.

The connector 41 includes a rod insertion chamber 42 into which the end of the rod 12 is inserted. The rod insertion chamber 42 is defined by a bottom wall 42a, a top wall 42b disposed above the bottom wall 42a, a vertical wall 42c configured to interconnect the rear side (the retreat side in the advancing and retreating direction DA, that is, the center shaft 13 side) of the top wall 42b and the bottom wall 42a, and a lateral wall 42d disposed outside the top wall 42b and the bottom wall 42a in the lateral direction DB to interconnect the top wall 42b and the bottom wall 42a. A hook 42x is provided on the top wall 42b to be caught by a groove 12a in the rod 12. The rod 12 is inserted into the rod insertion chamber 42 of the connector 41 and the hook 42x is caught by the groove 12a in the rod 12, whereby the connector 41 is fixed to the rod 12.

The connector 41 has an insertion groove 43 into which an insertion portion 51 (see the following description) of the second sliding member 50 is introduced. Specifically, the insertion groove 43 is formed in the lateral wall 42d. The insertion groove 43 extends forward from the rear surface (the surface on the rear side in the advancing and retreating direction DA) of the lateral wall 42d.

Figure 8:
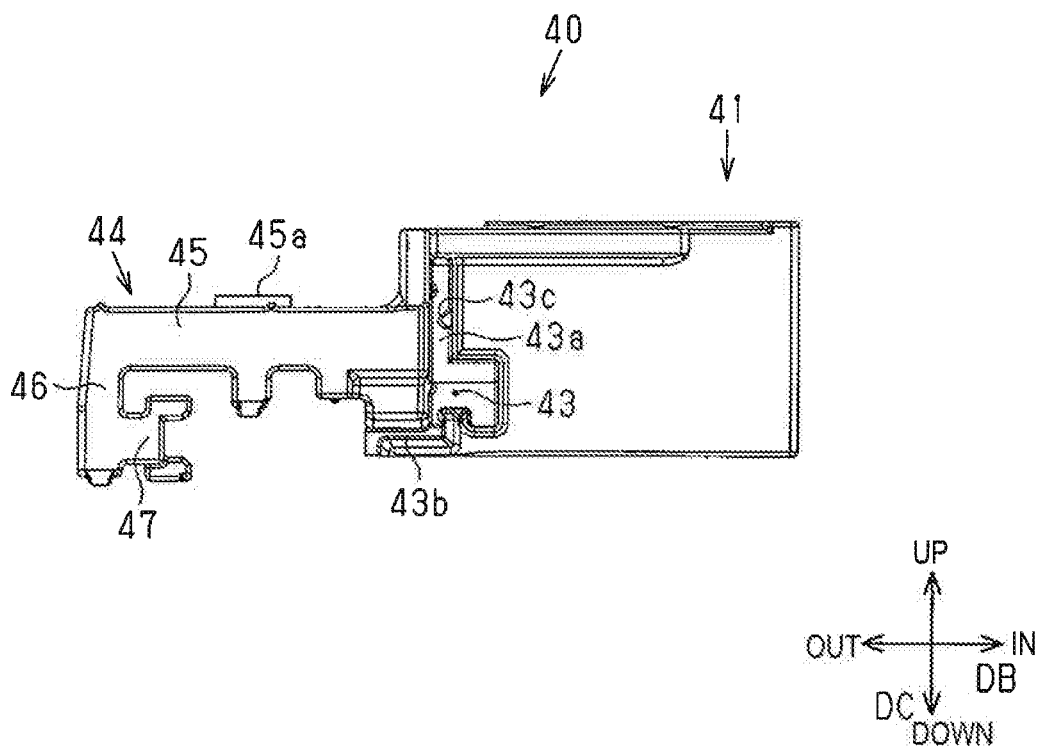
FIG. 8 is a rear view of the first sliding member.

As illustrated in FIG. 8, in the rear view (at a viewpoint for viewing the rear side surface), the insertion groove 43 includes a first groove portion 43a extending in the vertical direction DC and a second groove portion 43b extending in the lateral direction DB. The first groove portion 43a and the second groove portion 43b communicate with each other. A vertical plate portion 51y and an elastic portion 51b of the insertion portion 51 of the second sliding member 50 are inserted into the first groove portion 43a. A bottom plate portion 51x of the second sliding member 50 is inserted into the second groove portion 43b. A protrusion 43c is formed in the first groove portion 43a of the insertion groove 43. The protrusion 43c blocks a part of the passage in the groove space. The protrusion 43c protrudes from one surface of a pair of opposing surfaces in the first groove portion 43a toward the other surface. A gap into which the insertion portion 51 may be inserted is formed between the other surface and the protrusion 43c. In addition, the protrusion 43c is disposed on the rear side in the advancing and retreating direction DA in the first groove portion 43a.

Figure 6:
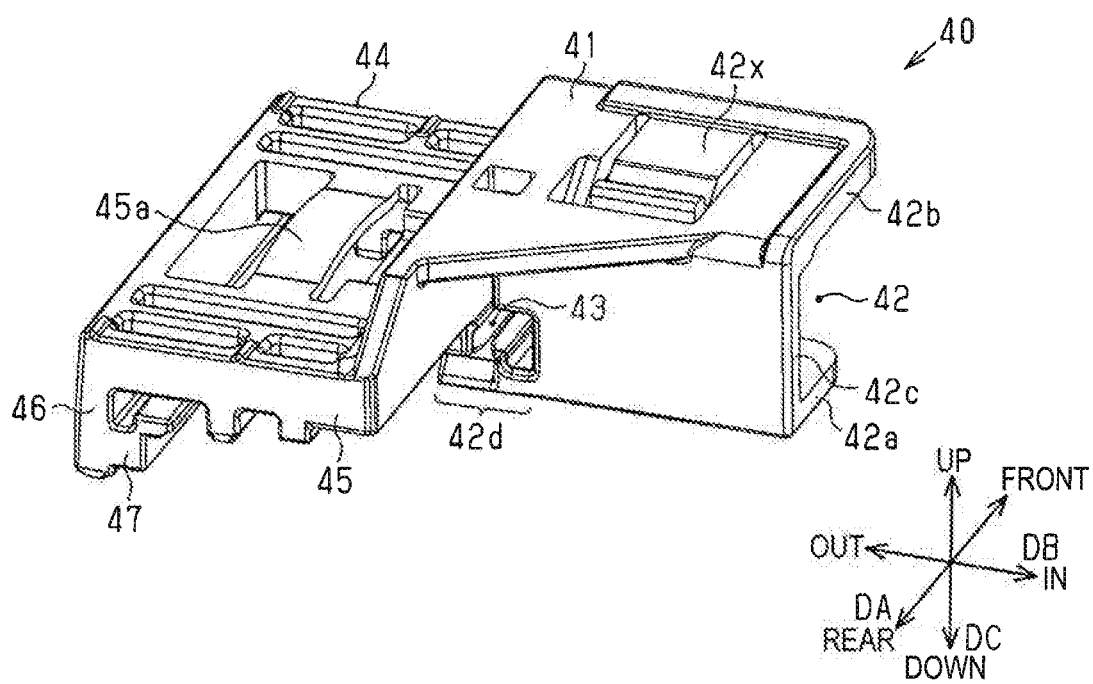
FIG. 6 is a perspective view of a first sliding member.

As illustrated in FIG. 6, the slider 44 of the first sliding member 40 includes a first arm 45 extending outward in the lateral direction DB from the connector 41 and a second arm 46 extending downward from the first arm 45. The first arm 45 is guided by the first arm guide 22 of the first guide groove 21. The second arm 46 is guided by the second arm guide 23 of the first guide groove 21.

Figure 7:
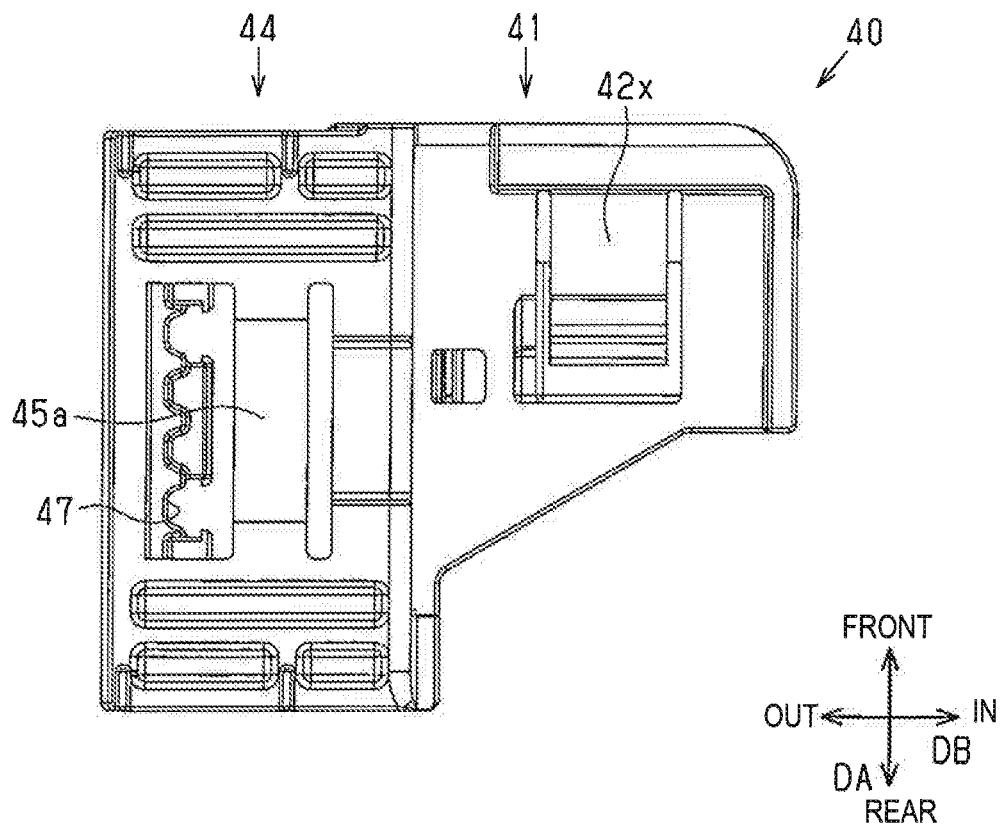
FIG. 7 is a plan view of the first sliding member.

As illustrated in FIGS. 6 and 7, the first arm 45 has a curved portion 45a that is curved upward. The curved portion 45a is bridged from the front portion to the rear portion of the first arm 45. The curved portion 45a comes into contact with an upper surface 22a of the first arm guide 22 at the top thereof (see FIG. 10).

The second arm 46 has a connecting portion 47 to which the power transmission member 2 is connected. The connecting portion 47 is formed on the outer side or the inner side of the second arm 46 in the lateral direction DB. Specifically, in one first sliding member 40 of the two first sliding members 40, a connecting portion 47 is formed on the outer side of the second arm 46 in the lateral direction DB, and in the other first sliding member 40, the connecting portion 47 is formed on the inner side of the second arm 46 in the lateral direction DB. The connecting portion 47 is guided, together with the power transmission member 2, in the third guide groove 26 of the guide rail 20 (see FIG. 10).

Figure 9:
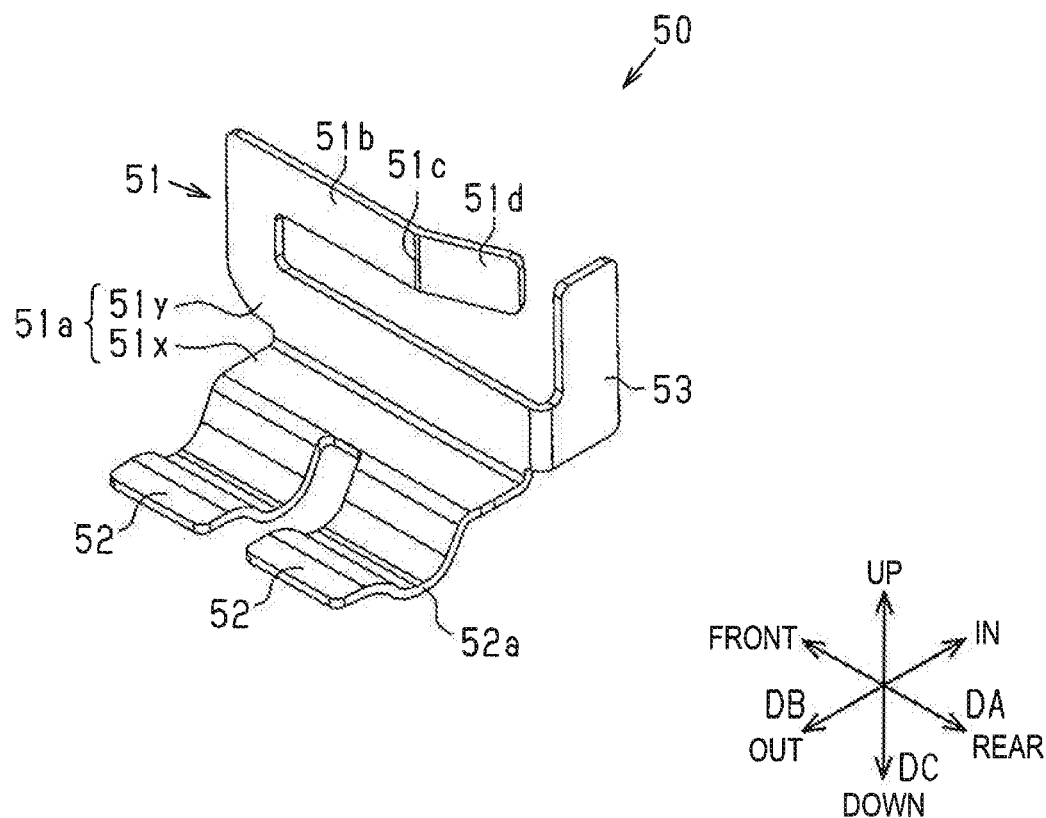
FIG. 9 is a perspective view of a second sliding member.

The second sliding member 50 will be described with reference to FIG. 9.

The second sliding member 50 may be configured with an elastic metal plate or a composite substrate including a metal plate. Examples of the metal plate include an iron plate and a stainless steel plate. The composite substrate may be, for example, an insert-molded product of a metal frame and a resin.

The second sliding member 50 includes the insertion portion 51 inserted into the insertion groove 43 in the connector 41, the shade support portion 52 extending from the insertion portion 51, and a pushing portion 53 extending from the insertion portion 51.

The insertion portion 51 includes a base portion 51a extending in an insertion direction (that coincides with the "front" in the present embodiment) and the elastic portion 51b that is elastically deformable. The base portion 51a includes the bottom plate portion 51x and the vertical plate portion 51y extending upward perpendicularly to the bottom plate portion 51x. The elastic portion 51b extends upward from the front portion of the vertical plate portion 51y of the base portion 51a, and further extends in the direction opposite to the insertion direction (hereinafter, "opposite insertion direction"). The elastic portion 51b is cantilevered so as to be easily deformed. In addition, the elastic portion 51b includes an inclined portion 51d. Specifically, the elastic portion 51b is bent at an intermediate portion in the opposite insertion direction. The inclined portion 51d corresponds to a portion behind a bent portion 51c. The inclined portion 51d is inclined inward (toward the shade 11) toward the opposite insertion direction. An end portion of the inclined portion 51d is disposed inside the protrusion 43c in the insertion direction at a position at which it may come into contact with the protrusion 43c in a state where the insertion portion 51 is inserted into the insertion groove 43.

The shade support portion 52 protrudes from the lower portion of the base portion 51a. Specifically, the shade support portion 52 extends outward in the lateral direction DB from the bottom plate portion 51x of the base portion 51a. Two shade support portions 52 are spaced apart from each other in the advancing and retreating direction DA, and extend outward from the bottom plate portion 51x in the lateral direction DB. Each of the shade support portions 52 has the concave portion 52a, which is recessed downward in the lateral direction DB. The shade support portion 52 is inserted into the bag 11e of the shade 11 and supports the shade corner portion 11g.

The pushing portion 53 is formed on the rear portion of the base portion 51a. Specifically, the pushing portion 53 is widened on the lower portion of the base portion 51a to be orthogonal to the base portion 51a. The pushing portion 53 is disposed outside the connector 41 in a state where the insertion portion 51 is inserted into the insertion groove 43 in the connector 41. The area of the pushing portion 53 is set to a size which is easily pushed by a finger.

A method of assembling the second sliding member 50 to the first sliding member 40 will be described with reference to FIGS. 3 and 4.

In a first procedure, the shade support portions 52 of the second sliding member 50 are inserted into the bags 11e of the shade corner portion 11g (see FIG. 4). In a second procedure, the first sliding member 40 and the second sliding member 50 are coupled to each other. Specifically, the end of the rod 12 is disposed in front of the first sliding member 40 so that the end of the rod 12 is inserted into the rod insertion chamber 42 of the connector 41. In addition, the insertion portion 51 of the second sliding member 50 is disposed on the rear side of the first sliding member 40 so that the insertion portion 51 is inserted into the insertion groove 43 in the first sliding member 40. Hereinafter, the elements assembled in this manner will be referred to as the guide assembly 39.

The guide assembly 39 will be described with reference to FIG. 10.

At least a portion of the slider 44 of the first sliding member 40 is disposed on the lateral side of the rod 12 in a state where the guide assembly 39 is attached to the rod 12 (hereinafter, "the attached state of the guide assembly 39"). For example, a portion of one-third or more of the slider 44 in the advancing and retreating direction DA is disposed on the lateral side of the rod 12, and the remaining portion protrudes rearward from the rod 12. In addition, in the attached state of the guide assembly 39, the shade support portion 52 of the second sliding member 50 is disposed on the lateral side of the rod 12.

In addition, in the attached state of the guide assembly 39, the slider 44 of the first sliding member 40 and the shade support portion 52 of the second sliding member 50 are arranged in the direction crossing the advancing and retreating direction DA of the shade 11. For example, the shade support portion 52 is disposed above or under the slider 44 in the vertical direction DC, or is disposed outside or inside the slider 44 in the lateral direction DB. In the present embodiment, the shade support portion 52 is disposed under the first arm 45 of the first sliding member 40. That is, the shade support portion 52 and the first arm 45 are arranged in the vertical direction DC. In addition, the shade support portion 52 is arranged with the second arm 46 inward of the lateral direction DB.

In relation to the guide rail 20, the first sliding member 40 and the second sliding member 50 are disposed as follows.

The first arm 45 of the first sliding member 40 is inserted into the first arm guide 22 of the guide rail 20. The second arm 46 is inserted into the second arm guide 23 of the guide rail 20. The connecting portion 47 of the second arm 46 is inserted into the third guide groove 26.

The shade support portion 52 of the second sliding member 50 and the shade corner portion 11g supported by the shade support portion 52 are inserted into the second guide groove 25. The concave portion 52a of the shade support portion 52 is in contact with the convex portion 25a of the second guide groove 25.

Next, an action of the sunshade device 1 will be described.

As illustrated in FIG. 5, when the shade 11 is wound around the center shaft 13 and the rod 12 retreats, the guide assembly 39 is brought into contact with the stopper 28 at the limit position, whereby the shade 11 is stopped. At this time, the opening area is maximized. The size of the opening area is determined by the stop position of the front end portion 11a of the shade 11. The opening area increases as the stop position of the front end portion 11a of the shade 11 is closer to the center shaft 13 side. Meanwhile, the stop position of the front end portion 11a of the shade 11 is determined by the contact between the guide assembly 39 and the stopper 28. Therefore, as the length of a portion of the guide assembly 39 that protrudes rearward from the rod 12 becomes larger, the stop position of the shade 11 is farther from the center axis 13, and the opening area becomes smaller.

According to the sunshade device 1 of the present embodiment, the slider 44 of the first sliding member 40 and the shade support portion 52 of the second sliding member 50 are arranged in the direction crossing the advancing and retreating direction DA of the shade 11. In addition, at least a portion of the slider 44 of the first sliding member 40 and at least a portion of the shade support portion 52 of the second sliding member 50 are disposed on the lateral side of the rod 12 in the lateral direction (the longitudinal direction of the rod).

Therefore, compared with the following reference example, it is possible to reduce the space SX occupied by a portion that protrudes rearward from the rod 12, in the structure including the slider 44 and the shade support portion 52 (the guide assembly 39 in the present embodiment). This makes it possible to move the shade 11 further toward the center shaft 13 compared with the reference example, and the opening area can be enlarged. The reference example is the structure in which the slider 44 of the first sliding member 40 and the shade support portion 52 of the second sliding member 50 are disposed behind the rod 12 (in the direction toward the center shaft 13 of the shade 11).

Effects of the sunshade device 1 will be described.

(1) The sunshade device 1 includes a first sliding member 40 and a second sliding member 50, which are guided by a guide rail 20. The first sliding member 40 includes a slider 44 attached to a corresponding one of the opposite ends of the rod 12. The second sliding member 50 includes a shade support portion 52 configured to support the shade corner portion 11g. The slider 44 of the first sliding member 40 and the shade support portion 52 of the second sliding member 50 are arranged in the direction crossing the advancing and retreating direction DA of the shade 11. In addition, at least a portion of the slider 44 of the first sliding member 40 and at least a portion of the shade support portion 52 of the second sliding member 50 are disposed on the lateral side of the rod 12 in the lateral direction (the longitudinal direction of the rod 12).

According to this configuration, compared with the above-described reference example, it is possible to reduce the space SX (see FIG. 5) occupied by a portion that protrudes rearward from the rod 12, in the structure (the guide assembly 39 in the present embodiment) including the slider 44 and the shade support portion 52. Thus, compared with the conventional structure, it is possible to move the shade 11 further toward the center shaft 13, and to enlarge the opening area.

(2) The first sliding member 40 includes a connector 41 connected to the corresponding end of the rod 12, and the slider 44. The slider 44 includes a first arm 45 extending from the connector 41 in the lateral direction DB and a second arm 46 extending in the longitudinal direction DC from the first arm 45. The shade support portion 52 is arranged with the second arm 46 of the slider 44 in the lateral direction DB.

According to this configuration, compared with a case where the second arm 46 of the slider 44 and the shade support portion 52 are arranged in the vertical direction DC, it is possible to reduce the thickness of the structure including the slider 44 and the shade support portion 52 (the guide assembly 39 in the present embodiment). Thus, it is possible to reduce the thickness of the sunshade device 1.

(3) The connector 41 of the first sliding member 40 includes an insertion groove 43 extending in the advancing and retreating direction DA. The insertion portion 51 of the second sliding member 50 is inserted into the insertion groove 43.

According to this configuration, the first sliding member 40 and the second sliding member 50 are coupled to each other by inserting the insertion portion 51 of the second sliding member 50 into the insertion groove 43 of the connector 41. In this way, an assembly operation of assembling the second sliding member 50 with the first sliding member 40 is simplified.

(4) In the sunshade device 1, the insertion groove 43 in the connector 41 of the first sliding member 40 includes a protrusion 43c that blocks a portion of a passage in a groove space. The insertion portion 51 of the second sliding member 50 includes an inclined portion 51d inclined in the direction opposite to the insertion direction. The end portion of the inclined portion 51d is disposed inside the protrusion 43c in the insertion direction in a state where the insertion portion 51 is inserted into the insertion groove 43. According to this configuration, the end portion of the inclined portion 51d of the insertion portion 51 of the second sliding member 50 is caught by a protrusion 43c in the insertion groove 43 of the first sliding member 40, whereby it is difficult for the second sliding member 50 to be separated from the first sliding member 40.

(5) In the sunshade device 1, the second sliding member 50 includes a pushing portion 53 extending from the insertion portion 51 and disposed outside the connector 41.

According to this configuration, by pushing the pushing portion 53, it is possible to simply insert the insertion portion 51 of the second sliding member 50 into the insertion groove 43 in the first sliding member 40.

(6) In the sunshade device 1, the second sliding member 50 is configured with a metal plate or a composite substrate including a metal plate. According to this configuration, it is possible to reduce the thickness of each portion of the second sliding member 50 compared with a case where the second sliding member 50 is formed of a resin. Thus, the guide assembly 39, which is the assembly of the first sliding member 40 and the second sliding member 50, may be made compact.

OTHER EMBODIMENTS

The sunshade device 1 is not limited to the example of the embodiment.

In the above embodiment, the shade support portion 52 of the second sliding member 50 is disposed under the first arm 45 of the slider 44 of the first sliding member 40, but the shade support portion 52 of the second sliding member 50 may be disposed above the first arm 45 of the slider 44 of the first sliding member 40. Even in this case, the same effect as the embodiment may be obtained.

In the above embodiment, the insertion groove 43 in the connector 41 is formed in the lateral wall 42d, but the configuration of the insertion groove 43 is not limited thereto. For example, the insertion groove 43 may be formed in the bottom wall 42a or the top wall 42b of the connector 41.

In the above embodiment, the slider 44 includes the first arm 45 and the second arm 46, but the structure of the slider 44 is not limited thereto. The slider 44 may include only an arm extending in the lateral direction DB. In addition, the slider 44 may include a third arm extending upward from the first arm 45, instead of the second arm 46.

(1) A sunshade device according to an aspect of this disclosure includes: a roll shade having a shade; a rod provided in a front end portion of the shade; two guide rails each configured to guide the shade; two first sliding members each having a slider attached to a corresponding one of opposite ends of the rod and guided by a corresponding one of the guide rails; and two second sliding members each having a shade support portion configured to support a shade corner portion and guided by a corresponding one of the guide rails. The slider of each first sliding member and the shade support portion of each second sliding member are arranged in a direction crossing an advancing and retreating direction of the shade, and at least a portion of the slider of the first sliding member and at least a portion of the shade support portion of the second sliding member are disposed on a lateral side of the rod in a lateral direction along the rod.

According to this configuration, the slider of the first sliding member and the shade support portion of the second sliding member are arranged in the direction crossing the advancing and retreating direction, and at least a portion of the slider of the first sliding member and at least a portion of the shade support portion of the second sliding member are disposed on the lateral side of the rod. Therefore, compared with a case where the slider of the first sliding member and the shade support portion of the second sliding member are disposed behind the rod (in the direction toward a center shaft of the shade), it is possible to reduce the space occupied by a portion that protrudes rearward from the rod, in the structure including the slider and the shade support portion. Thus, compared with the conventional structure, it is possible to move the shade further toward the center shaft, and to enlarge the opening area.

(2) In the sunshade device, the first sliding member may include a connector connected to the corresponding end of the rod and the slider, the slider may include a first arm extending from the connector in the lateral direction and a second arm configured extending from the first arm in a vertical direction crossing the lateral direction and the advancing and retreating direction, and the shade support portion may be arranged with respect to the second arm of the slider in the lateral direction.

According to this configuration, compared with a case where the second arm of the slider and the shade support portion are arranged in the vertical direction, it is possible to reduce the thickness of the structure including the slider and the shade support portion in the vertical direction. Thus, it is possible to reduce the thickness of the sunshade device.

(3) In the sunshade device, the connector of the first sliding member may include an insertion groove extending in the advancing and retreating direction, and the second sliding member may include an insertion portion inserted into the insertion groove.

According to this configuration, the first sliding member and the second sliding member are coupled to each other by inserting the insertion portion of the second sliding member into the insertion groove in the connector of the first sliding member. In this way, an assembly operation of assembling the second sliding member with the first sliding member is simplified.

(4) In the sunshade device, the insertion groove in the connector of the first sliding member may include a protrusion that blocks a portion of a passage in a groove space, the insertion portion of the second sliding member may include an inclined portion inclined in a direction opposite to an insertion direction, and an end portion of the inclined portion may be disposed inside the protrusion in the insertion direction in a state where the insertion portion is inserted into the insertion groove.

According to this configuration, when the insertion portion of the second sliding member is inserted into the insertion groove of the first sliding member, the end portion of the inclined portion of the insertion portion of the second sliding member is caught by the protrusion in the insertion groove of the first sliding member, whereby it is difficult for the second sliding member to be separated from the first sliding member.

(5) In the sunshade device, the second sliding member may include a pushing portion extending from the insertion portion and disposed outside the connector.

According to this configuration, by pushing the pushing portion, it is possible to simply insert the insertion portion of the second sliding member into the insertion groove of the first sliding member.

(6) In the sunshade device, the second sliding member may be configured with a metal plate or a composite substrate including a metal plate.

According to this configuration, compared with a case where the second sliding member is formed of a resin, it is possible to reduce the thickness of each portion of the second sliding member. Thus, the guide assembly, which is the assembly of the first sliding member and the second sliding member, may be made compact.

According to the sunshade device, it is possible to increase the opening area compared with a sunshade device in the related art.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunshade device comprising:
a roll shade having a shade;
a rod provided in a front end portion of the shade;
two guide rails each configured to guide the shade;
two first sliding members each having a slider attached to a corresponding one of opposite ends of the rod and guided by a corresponding one of the guide rails; and
two second sliding members each having a shade support configured to support a shade corner portion and guided by a corresponding one of the guide rails, wherein
the slider of each first sliding member and the shade support of each second sliding member are arranged in a direction crossing an advancing and retreating direction of the shade,
at least a portion of the slider of the first sliding member and at least a portion of the shade support of the second sliding member are disposed on a lateral side of the rod in a lateral direction along the rod,
the first sliding member includes a connector connected to a corresponding end of the rod and the slider,
the slider includes a first arm extending from the connector in the lateral direction and a second arm extending from the first arm in a vertical direction crossing the lateral direction and the advancing and retreating direction,
the shade support is arranged with respect to the second arm of the slider in the lateral direction,
the second arm is formed on an edge of the first arm in the lateral direction,
the connector of the first sliding member includes an insertion groove extending in the advancing and retreating directing, and
the second sliding member includes an insert inserted into the insertion groove.

2. The sunshade device according to claim 1,
wherein the insertion groove in the connector of the first sliding member includes a protrusion that blocks a portion of a passage in a groove space, and
the insert of the second sliding member includes an inclined portion inclined in a direction opposite to an insertion direction, and an end portion of the inclined portion is disposed inside the protrusion in the insertion direction in a state where the insert is inserted into the insertion groove.

3. The sunshade device according to claim 1,
wherein the second sliding member includes a pusher extending from the insert and disposed outside the connector.

4. The sunshade device according to claim 2,
wherein the second sliding member includes a pusher extending from the insert and disposed outside the connector.

5. The sunshade device according to claim 1,
wherein the second sliding member includes a metal plate or a composite substrate including a metal plate.

6. The sunshade device according to claim 2,
wherein the second sliding member includes a metal plate or a composite substrate including a metal plate.

7. The sunshade device according to claim 3,
wherein the second sliding member includes a metal plate or a composite substrate including a metal plate.

8. The sunshade device according to claim 1, further comprising
a drive device, wherein
the drive device includes a motor, a gear rotated by the motor, and power transmission members which are engaged with the gear; and
one of the power transmission members is connected to the first sliding member.

* * * * *